(12) United States Patent
Hirano et al.

(10) Patent No.: US 7,548,679 B2
(45) Date of Patent: Jun. 16, 2009

(54) CONTAINER FOR ACCOMMODATING OPTICAL FIBER COIL AND OPTICAL FIBER MODULE HAVING THE CONTAINER

(75) Inventors: Masaaki Hirano, Kanagawa (JP); Masahiro Yamaguchi, Kanagawa (JP); Masaki Tsuruga, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 11/923,269

(22) Filed: Oct. 24, 2007

(65) Prior Publication Data

US 2008/0152294 A1 Jun. 26, 2008

(30) Foreign Application Priority Data

Oct. 26, 2006 (JP) ............................. 2006-290653

(51) Int. Cl.
*G02B 6/00* (2006.01)
(52) U.S. Cl. ..................................... 385/134
(58) Field of Classification Search .............. 385/135
See application file for complete search history.

(56) References Cited

U.S. PATENT DOCUMENTS

| | | | | | |
|---|---|---|---|---|---|
| 4,722,585 | A | * | 2/1988 | Boyer | 385/135 |
| 4,765,708 | A | * | 8/1988 | Becker et al. | 385/135 |
| 4,770,357 | A | * | 9/1988 | Sander et al. | 242/400.1 |
| 4,886,336 | A | * | 12/1989 | Deusser et al. | 385/135 |
| 4,900,121 | A | * | 2/1990 | Becker et al. | 385/135 |
| 5,069,523 | A | * | 12/1991 | Finzel et al. | 385/135 |
| 5,515,200 | A | * | 5/1996 | Delrosso et al. | 359/341.1 |
| 5,544,273 | A | * | 8/1996 | Harrison | 385/135 |
| 5,657,412 | A | * | 8/1997 | Caudrelier | 385/135 |
| 5,802,237 | A | * | 9/1998 | Pulido | 385/135 |
| 6,201,923 | B1 | * | 3/2001 | Yuhara et al. | 385/137 |
| 6,347,760 | B1 | * | 2/2002 | Talamini, Sr. | 242/388 |
| 6,480,660 | B1 | * | 11/2002 | Reitmeier et al. | 385/135 |
| 6,580,866 | B2 | * | 6/2003 | Daoud et al. | 385/135 |
| 6,612,515 | B1 | * | 9/2003 | Tinucci et al. | 242/388.1 |
| 6,625,374 | B2 | * | 9/2003 | Holman et al. | 385/135 |

(Continued)

FOREIGN PATENT DOCUMENTS

EP 1 372 279 A2 12/2003

(Continued)

*Primary Examiner*—Frank G Font
*Assistant Examiner*—Ryan Lepisto
(74) *Attorney, Agent, or Firm*—Global IP Counselors, LLP (57) ABSTRACT

A container for an optical fiber coil and an optical fiber module including the container is provided, wherein an excess length portion of a pigtail fiber is accommodated in the container and the remaining portion can be drawn out from the container. The container includes a first part for accommodating a coil having a functional optical fiber, and a second part disposed on an outer periphery side of the first part and windingly accommodating a pigtail fiber that is optically connected to the functional optical fiber. The second part has a gap that extends over the entirety of the outer periphery, and communicates with the exterior. The optical fiber module includes the container, the coil having the functional optical fiber accommodated in the first part of the container, and the pigtail fiber that is optically connected to the functional fiber and that has a portion windingly accommodated in the second part.

10 Claims, 7 Drawing Sheets

U.S. PATENT DOCUMENTS

| | | | |
|---|---|---|---|
| 6,643,444 B1 * | 11/2003 | Putnam | 385/135 |
| 6,814,328 B1 * | 11/2004 | Li et al. | 242/400.1 |
| 6,978,072 B2 * | 12/2005 | Arima | 385/135 |
| 7,000,863 B2 * | 2/2006 | Bethea et al. | 242/388.1 |
| 7,315,681 B2 * | 1/2008 | Kewitsch | 385/135 |
| 2002/0118944 A1 * | 8/2002 | Burns et al. | 385/135 |
| 2003/0142938 A1 * | 7/2003 | Koyano et al. | 385/123 |
| 2005/0213919 A1 * | 9/2005 | Minegishi | 385/135 |
| 2007/0036505 A1 * | 2/2007 | Seifert | 385/135 |

FOREIGN PATENT DOCUMENTS

| | | |
|---|---|---|
| JP | 10-79542 A | 3/1998 |
| JP | 2003-004951 A | 1/2003 |
| JP | 2006-201662 A | 8/2006 |
| WO | WO 00/17693 A1 | 3/2000 |

\* cited by examiner

CONTAINER FOR ACCOMMODATING OPTICAL FIBER COIL AND OPTICAL FIBER MODULE HAVING THE CONTAINER

BACKGROUND OF THE INVENTION

1. Field of the Invention

The present invention relates to a container for accommodating a coil comprising a functional optical fiber, and to an optical fiber module having the container.

2. Description of the Background Arts

Optical fiber modules comprise, for example, a box-shaped container, a functional optical fiber wound in a coil shape and accommodated in a container, and an optical connection terminal for establishing a connection to an external optical device provided to an end of the functional fiber. The functional optical fiber may be a dispersion compensating fiber (DCF), an optical amplifying fiber, a highly nonlinear fiber (HNLF), or the like. The optical fiber coil comprising the functional fiber is commonly accommodated in a container in a configuration wherein the optical fiber coil is wound around a bobbin, or is covered in a resin. The optical connection terminal is connected to input/output ends of the optical fiber coil through an optical fiber that has an excess length part.

Figure 7A:
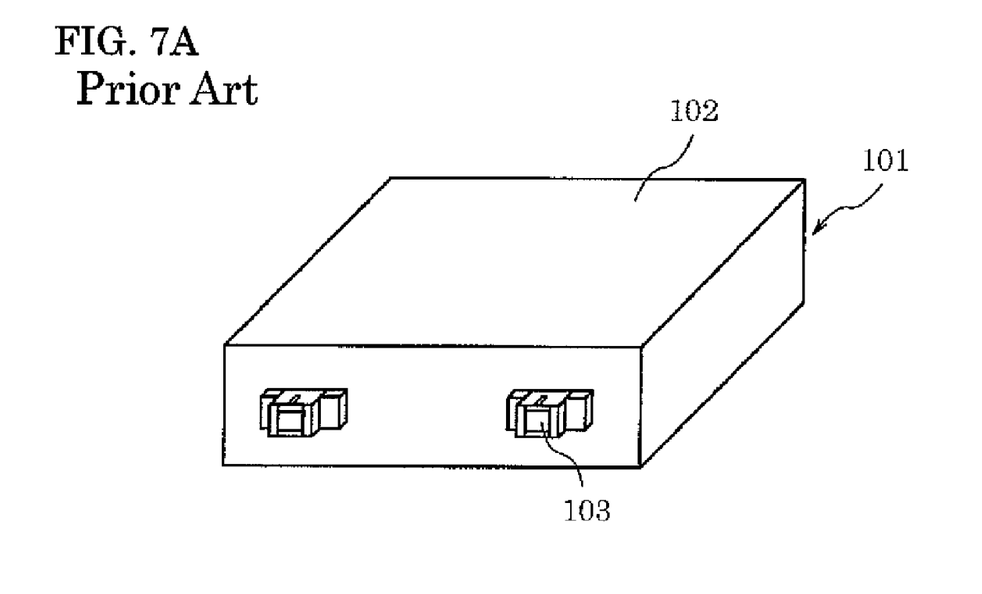
FIGS. 7A and 7B are perspective views that show a conventional optical fiber module.
Figure 7B:
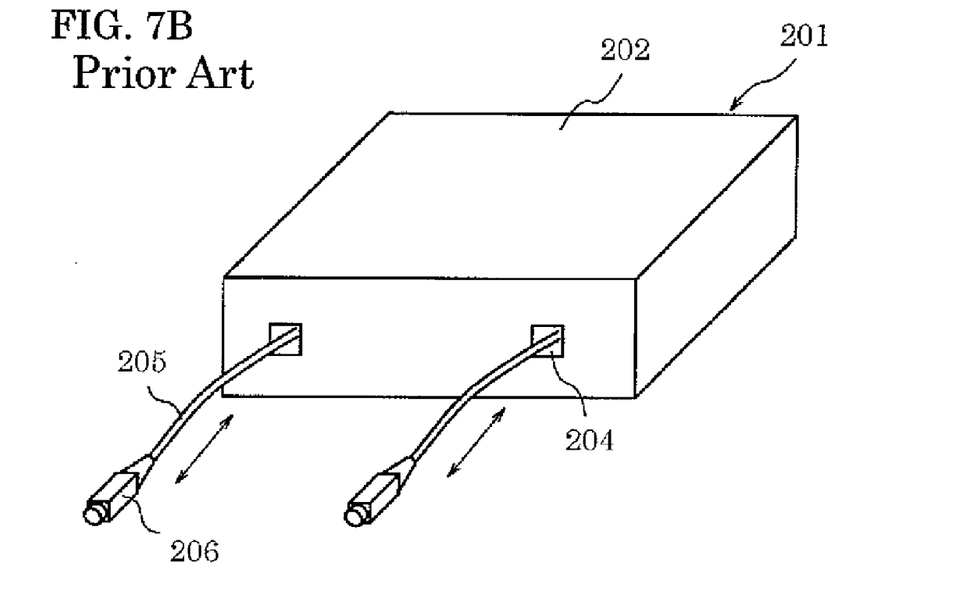

FIGS. 7A and 7B are perspective views of conventional optical fiber modules. An optical fiber module 101 as shown in FIG. 7A is disclosed in Japanese Laid-Open Patent Application Publication No. 2003-4951. The optical fiber module 101 has an optical connection terminal (connection adapter 103) for connecting an optical fiber cord on a front wall part of a container 102. An optical connector provided to an end of the optical fiber that has an excess length part is inserted into the connection adapter 103.

An optical fiber module 201 as shown in FIG. 7B is disclosed in Japanese Laid-Open Patent Application Publication No. 2006-201662. The optical fiber module 201 has a pigtail optical fiber 205 in a manner in which it can be drawn in and out via a hole 204 provided to a front wall part of a container 202. The inner end of the pigtail optical fiber 205 is fusion-spliced to input/output ends of the coil comprising the functional optical fiber. An optical connection terminal (optical connector 206) is attached to an end that is drawn out to the exterior. An excess length portion of the pigtail optical fiber 205 is extendably accommodated on an excess-length takeup reel or the like inside the container 202 so that the length of the pigtail optical fiber 205 drawn out is adjusted in association with the connection distance relative to an exterior optical device and is maintained.

It is necessary to use an optical fiber cord that has an optical connector on both ends in order to connect the optical fiber module 101 to the external optical device. This increases the number of connection points using optical connectors, and leads to a problem having large connection loss. In addition, when optical damage leads to malfunctioning of the optical connection terminals, it is difficult to exchange it.

The fiber module 201 can be connected directly to the external optical device through the pigtail optical fiber, and increment of connection losses due to the optical connector can be prevented. In addition, when optical damage causes a malfunction to occur in the optical connection terminals, it is easy to exchange it. However, the mechanism accommodating the excess length portion is complex. Furthermore, the bend radius tends to be relatively small, and a risk is presented that the pigtail optical fiber will be damaged. Another problem with this configuration is that the excess length portion, which can be drawn out from the container, cannot be made very long.

SUMMARY OF THE INVENTION

An object of the present invention is to provide a container for accommodating an optical fiber coil, wherein a prescribed length of an excess length portion of a pigtail optical fiber to which an optical connector is attached is accommodated in the container, and the remaining portion can be drawn out from the container, and to provide an optical fiber module comprising the container for accommodating the optical fiber coil.

In order to achieve the object, a container for accommodating an optical fiber coil includes a first accommodating part for accommodating an optical fiber coil having a functional optical fiber, and a second accommodating part which is present on an outer periphery of the first accommodating part and which windingly accommodates a pigtail optical fiber that is optically connected to the functional optical fiber. The second accommodating part has a gap that extends over the entirety of the outer periphery, and communicates with the exterior.

An optical fiber module includes the container for accommodating an optical fiber coil according to one aspect of the present invention, an optical fiber coil having a functional optical fiber accommodated in the first accommodating part, and a pigtail optical fiber which is optically connected to the functional fiber and which has a portion windingly accommodated in the second accommodating part. The second accommodating part has a gap that extends over the entirety of the outer periphery, and communicates with the exterior.

According to the present invention, the excess length portion of the pigtail optical fiber can be readily accommodated using a simple configuration, and without using a special accommodating mechanism. The optical fiber can be drawn outward to a desired length without being excessively bent, and connected to the external optical device at an appropriate length. Furthermore, the coil diameter of the functional optical fiber can be reduced, and the configuration of the optical fiber module can be made small and compact.

DETAILED DESCRIPTION OF THE INVENTION

The above-mentioned features and other features, aspects, and advantages of the present invention will be better understood through the following description, appended claims, and accompanying drawings. In the explanation of the drawings, an identical mark is applied to identical elements and an overlapping explanation will be omitted.

Figure 1A:
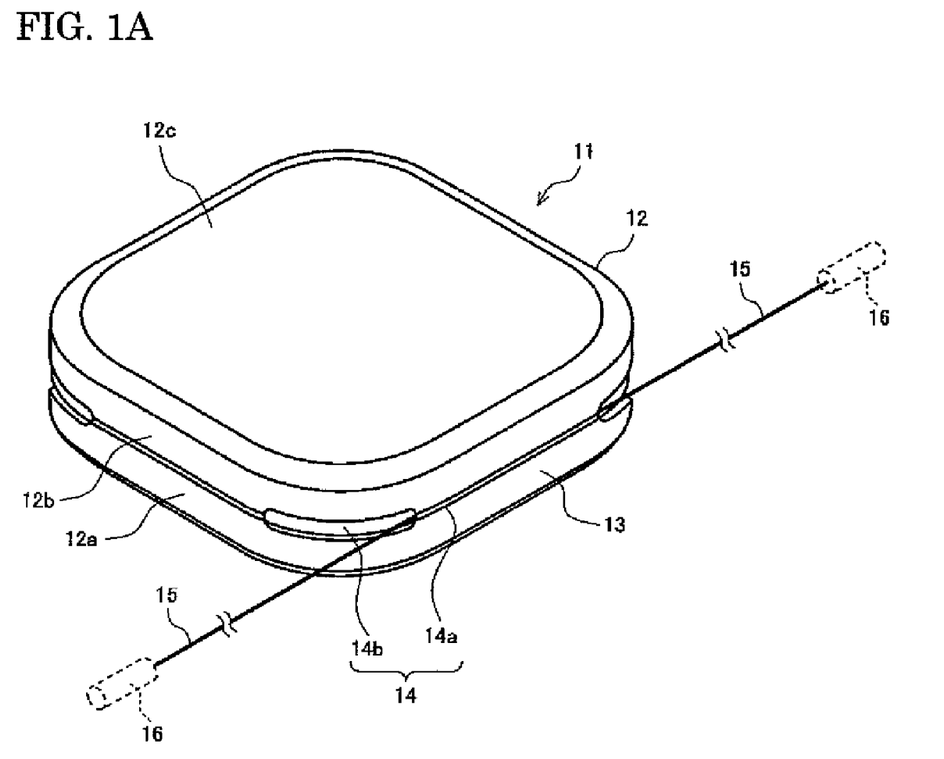
FIGS. 1A and 1B show an embodiment of an optical fiber module according to the present invention, with FIG. 1A being a perspective view, and FIG. 1B being a front view that shows a state wherein half of the container has been removed.
Figure 1B:
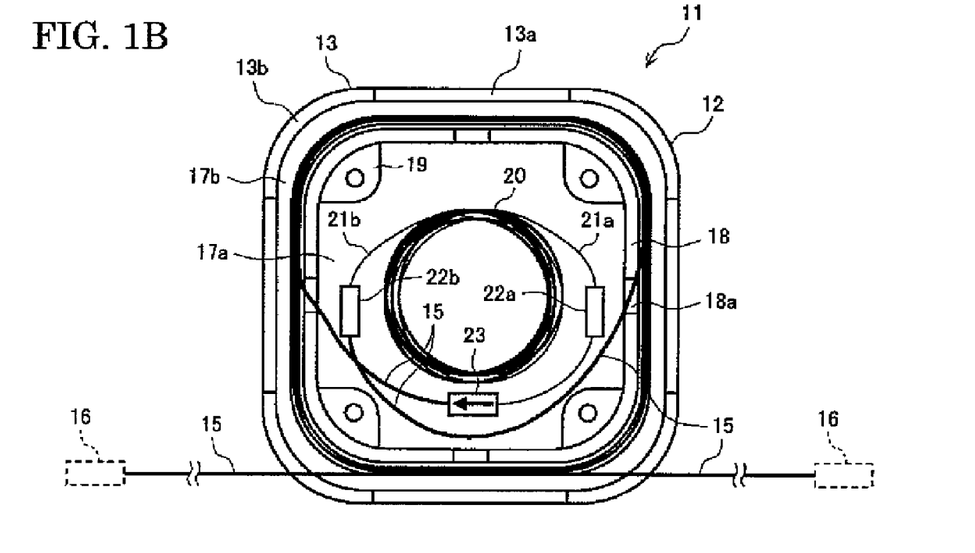

FIGS. 1A and 1B show an embodiment of an optical fiber module according to the present invention, with FIG. 1A being a perspective view, and FIG. 1B being a front view that shows a state wherein half of the container has been removed. A container 12 of an optical fiber module 11 is, for example, in a flat square shape, and the corner portions of the container 12 have a smooth, rounded shape. A sidewall 13 of the container 12 has a gap 14 that extends around the entire periphery of the sidewall 13. A label 12c or the like imprinted with specifications, manufacturing-related numbers, and other information relating to the optical fiber module is affixed to a container on either an upper or a lower side of the container 12.

The gap 14 comprises a small width portion 14a and a large width portion 14b. The small width portion 14a has a width that is equal to or less than twice the outside diameter of a pigtail optical fiber 15. The pigtail optical fiber 15 can be inserted into the container 12 by being wound on the container and it can be accommodated within the container 12. However, the pigtail optical fiber 15 accommodated within the container 12 will not readily protrude to the exterior from the small width portion 14a. The large width portion 14b has a width that is greater than twice the outside diameter of the pigtail optical fiber 15. The pigtail optical fiber 15 that is accommodated within the container 12 is drawn outward from the large width portion 14b. The pigtail fiber 15 may be drawn outward from the small width portion 14a, but in that case, the pigtail optical fiber 15 should be anchored to the optical fiber module 11 using adhesive tape.

An optical fiber coil 20, which comprises a functional optical fiber, and the pigtail optical fiber 15, which has an excess length part connected to input/output ends of the optical fiber coil 20 are accommodated and held within the container 12 of the optical fiber module 11. The container 12 is formed using a synthetic resin or the like. The container 12 has a first accommodating part 17a for accommodating the optical fiber coil 20, and a second accommodating part 17b that is partitioned by a partition wall 18 and that windingly accommodates the pigtail optical fiber 15. The radius of curvature at the corner portions of the partition wall 18 preferably is equal to or greater than the allowable bending radius of the optical fiber.

The second accommodating part 17b has the side wall 13 that forms the outside surface of the container 12 and the interior partition wall 18 such that it is formed in the shape of a groove surrounding the outer periphery of the first accommodating part 17. The second accommodating part 17b has an accommodation space of sufficient size to allow several turns of the pigtail optical fiber 15 to be accommodated. The pigtail optical fiber 15 is, for example, an optical fiber cord having an outside diameter of approximately 1 mm, and having a strength-reinforced fiber sheath. An optical connector 16 used to form an optical connection with an external optical device is attached to one end of the pigtail optical fiber 15. The other end of the pigtail optical fiber is connected to a fiber end parts 21a, 21b that form the input/output ends of the optical fiber coil 20, or to an isolator, wavelength selection filter, or other optical component 23.

The functional fiber wound in the optical fiber coil 20 is composed of, for example, a dispersion compensating fiber (DCF), an erbium doped optical fiber (EDF), or a highly nonlinear fiber (HNLF). A DOCF is an optical fiber that compensates for wavelength dispersion along the optical transmission line. An EDF is an optical fiber used for amplification purposes. An HNLF is an optical fiber used for subjecting signal light having a plurality of wavelengths to wavelength conversion or pulse compression all together. The optical fiber coil 20 can assume any of a variety of configurations; e.g., a configuration wherein the coil 20 is wound on a flanged bobbin, and a configuration wherein the fiber is wound into a coil, and subsequently integrated into a single body using a resin or the like to prevent the fiber from uncoiling even if a bobbin is not used. The optical fiber coil 20 is accommodated and held within the first accommodating part 17a by bonding, a clamper, or other holding means (not shown).

The fiber end parts 21a, 21b of the optical fiber coil 20, the pigtail optical fiber 15, and the optical component 23 are fusion-spliced. The connection part is reinforced by connection reinforcement bodies 22a, 22b formed from a heat-shrinkable tube or the like. Being rigid, the connection reinforcement bodies 22a, 22b are therefore preferably accommodated in a state of being bonded, held with a clamper, or otherwise secured in place within the first accommodating part 17a provided with a relative amount of space. In the case that an optical component 23 has been connected, the optical component is also accommodated and held within the first accommodating part 17a. A post 19 for a screw member used to join top and bottom containers 12a, 12b together is integrally provided to the first accommodating part 17a.

Figure 2A:
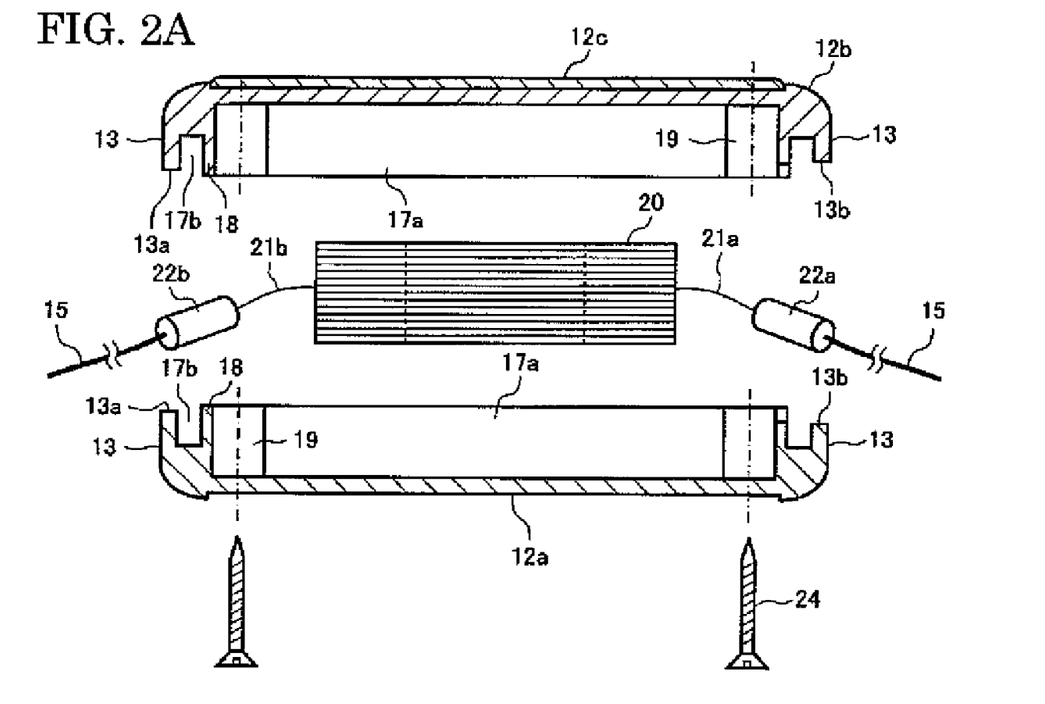
FIGS. 2A and 2B show an embodiment of an optical fiber module according to the present invention, with FIG. 2A being a cross-sectional view of a state wherein half of the container has been detached, and FIG. 2B being a cross-sectional view of a state wherein the container has been assembled.
Figure 2B:
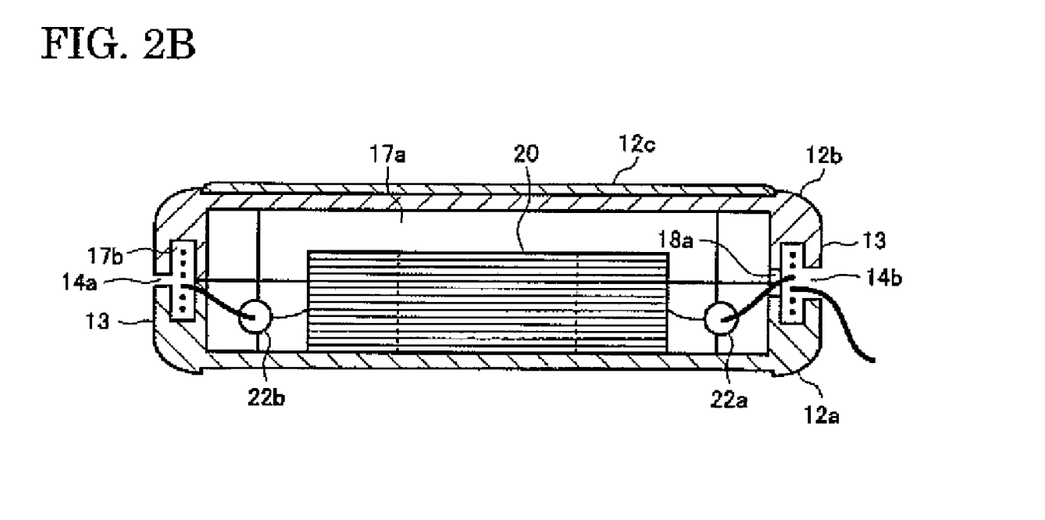

FIGS. 2A and 2B show an embodiment of an optical fiber module according to the present invention, with FIG. 2A being a cross-sectional view of a state wherein half of the container has been detached, and FIG. 2B being a cross-sectional view of a state wherein the container has been assembled. The bottom container 12a and top container 12b, which are of similar shapes, are made to face each other, and joined using an assembling screw 24 to assemble the container 12. Once the container 12 has been assembled, the optical fiber coil 20 will be accommodated in a completely enclosed state within the first accommodating part 17a. The pigtail optical fiber 15 is accommodated in the second accommodating part 17b which communicates with the exterior via the small width portion 14a and large width portion 14b. Through these gaps, the pigtail optical fiber 15 is drawn out or accommodated, and is adjusted so as to be of a prescribed amount when drawn outward.

The sidewall 13 that forms the outer peripheral surface (outer periphery wall of the second accommodating part) of the container 12 comprises edges 13a, 13b for forming the small width portion 14a and the large width portion 14b. The edge 13b that forms the large width portion 14b is a shape obtained by slightly cutting into the edge 13a that forms the small width portion 14a.

The large width portion 14b is formed in the corner regions of the container 12 having a generally polygonal shape. The small width portion 14a is formed on the side regions (straight-line portions) of the generally polygonal shape of the container 12. Forming such a gap allows the pigtail optical fiber 15 that is wound around the outer periphery of the partition wall 18 (inner periphery wall of the second accommodating part) to be drawn out from the large width portion 14b along a straight line extending from the side regions in the generally polygonal shape, while minimizing expansion to the outside. As a result, the pigtail optical fiber 15 can be smoothly drawn out to the exterior without being excessively bent such that the pigtail optical fiber 15 can be prevented to be damaged and transmission loss through bending can also be prevented from occurring. The large width portion 14b may be provided to at least one corner region. However, by utilizing the corner regions in the generally polygonal shape and providing the large width portion 14b to multiple locations, the direction in which the pigtail optical fiber 15 is drawn out can be chosen as desired, and the length to which the fiber is drawn out can be readily adjusted.

A passage 18a is provided to the partition wall 18 in order to create communication between the first accommodating part 17a and the second accommodating part 17b. The passage 18a is used to guide the pigtail optical fiber 15, which is fusion-spliced to the fiber ends 21a, 21b of the optical fiber coil 20 from the first accommodating part 17a to the second accommodating part 17b, and is formed, e.g., on the side regions in the generally polygonal shape. Forming the passage 18a on the side regions enables the pigtail optical fiber 15 to be guided into the second accommodating part 17b in a relatively smooth manner without the fiber 15 being subjected to excessive bending, in comparison to what would occur if the passage 18 were formed in the corner regions. As a result, the pigtail optical fiber 15 cannot suffer any damage, and transmission loss increase due to bending can be prevented.

Figure 3A:
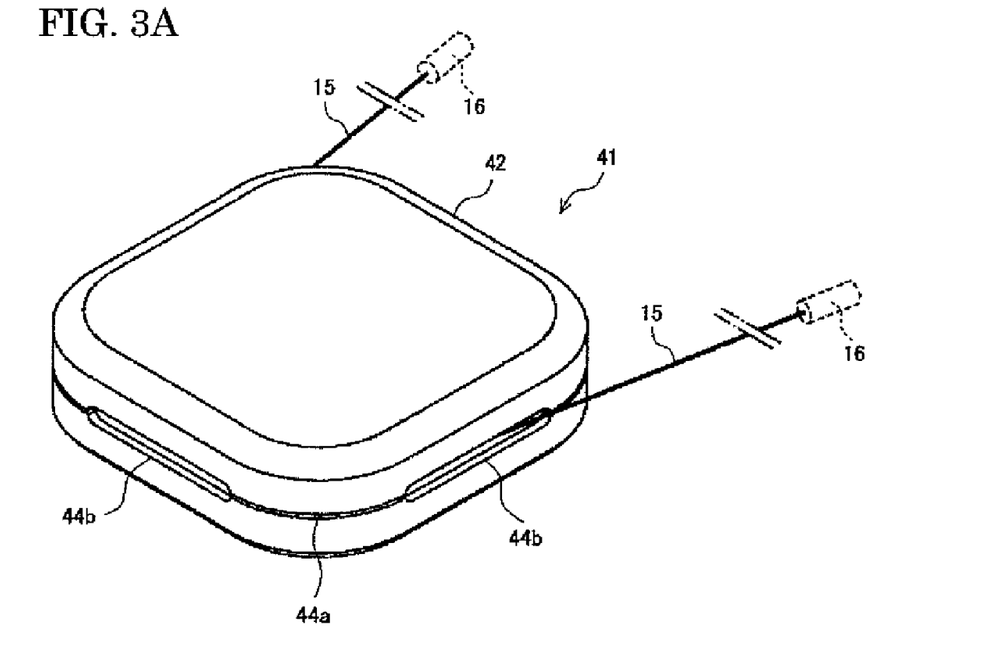
FIGS. 3A and 3B are perspective views that show another embodiment of an optical fiber module according to the present invention.
Figure 3B:
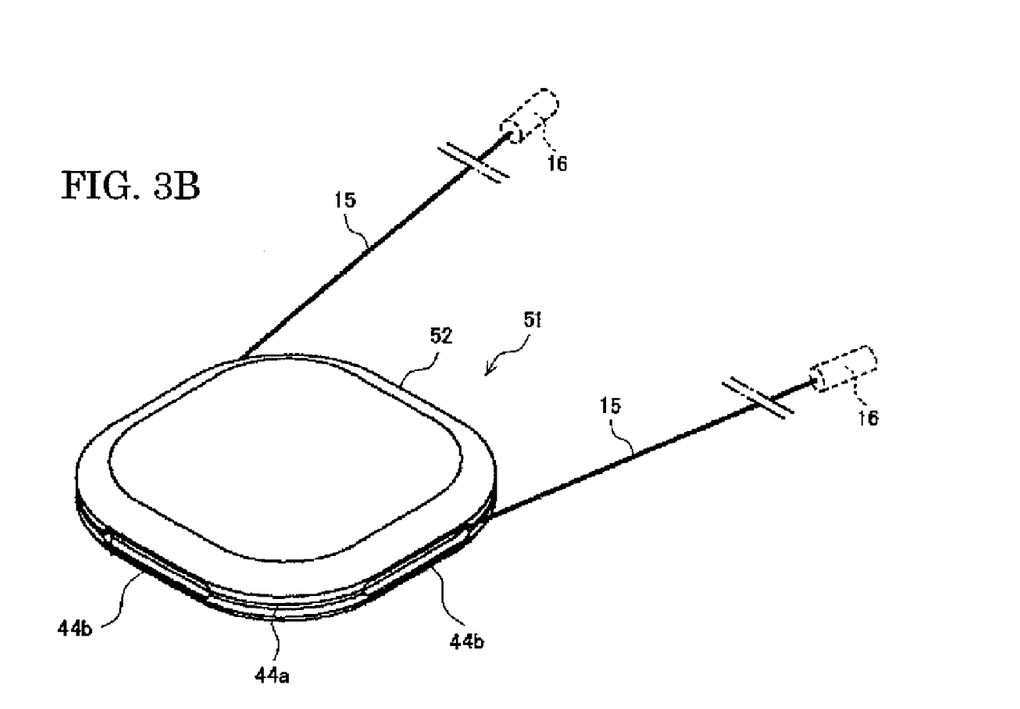

FIGS. 3A and 3B are perspective views that show another embodiment of an optical fiber module according to the present invention. An optical fiber module 41 that is shown in FIG. 3A differs from the optical fiber module 11 in that the optical fiber module 41 has a container 42 wherein a small width portion 44a is formed in the corner regions of a container having a generally polygonal shape, and a wide width portion 44b is formed on the side regions thereof. FIG. 3B shows an optical fiber module 51 having a container 52 shaped as a thinner variant of the container 42. The optical fiber module 51 may be fashioned into a variety of sizes and forms according to the fiber length of the optical coil accommodated within the container.

Figure 4A:
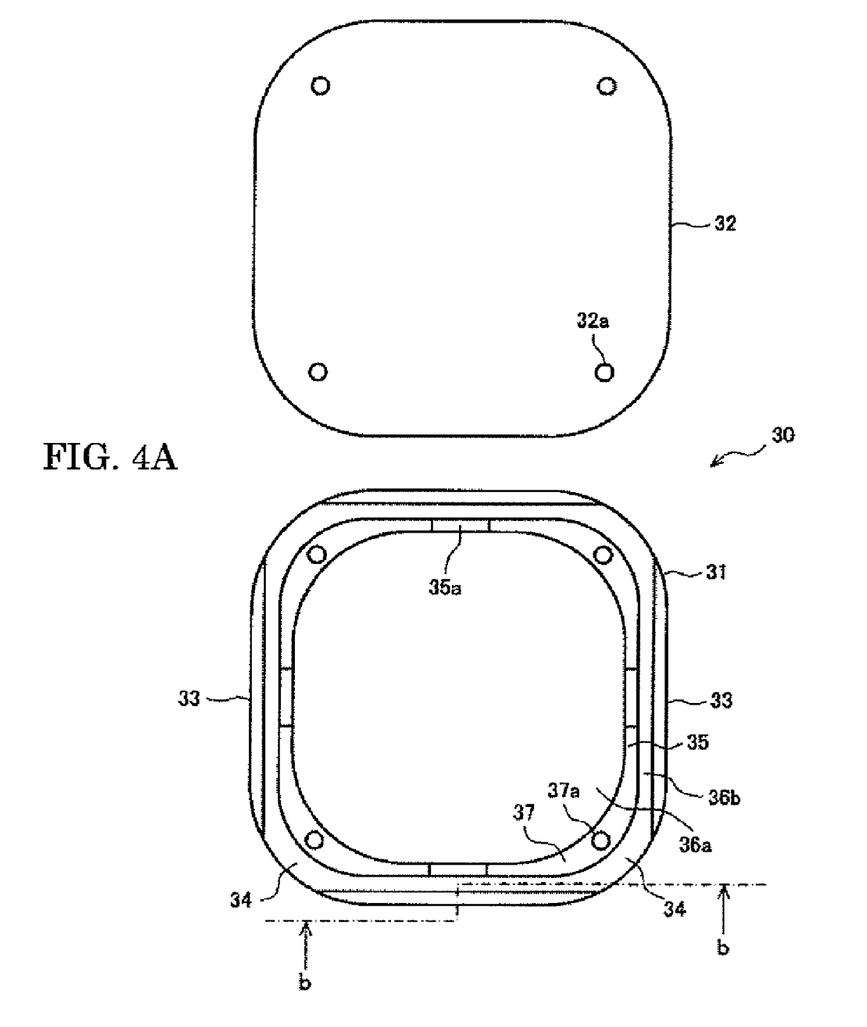
FIGS. 4A and 4B show yet another embodiment of an optical fiber module according to the present invention, with FIG. 4A being a front view of a state wherein a cover has been removed from the container, and FIG. 4B being a b-b cross-section view of FIG. 4A.
Figure 4B:
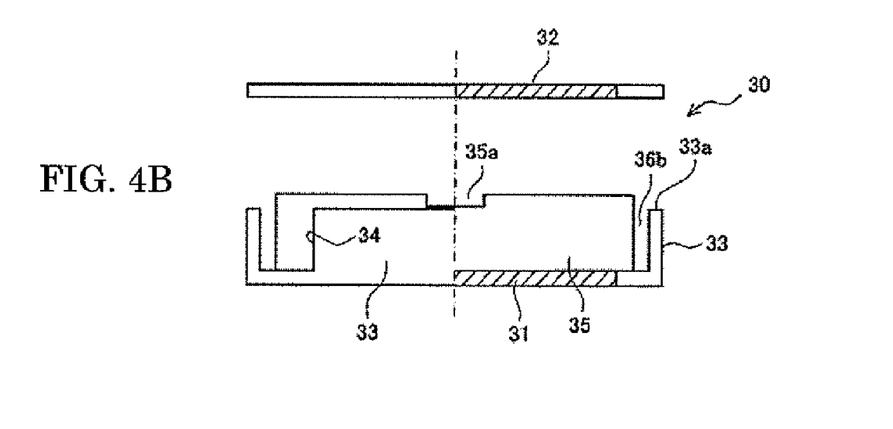

FIGS. 4A and 4B show yet another embodiment of an optical fiber module according to the present invention, with FIG. 4A being a front view showing a state wherein a cover 32 has been removed from a container 31, and FIG. 4B being a cross-section view across b-b in FIG. 4A. In this embodiment, a container 30 is composed of the container main body 31 and the cover 32. The container 30 has a configuration equivalent to one of upper and lower containers of a container 12 being formed to double depth to yield a container main body, and the other container formed as a flat cover. The container body 31 is formed from a synthetic resin or the like, and has a first accommodating part 36a, which is partitioned using a partition wall 37 and which is used for accommodating an optical fiber coil; and a second accommodating part 36b, which is formed between a partition wall 35 and a side wall 33, and which is used for windingly accommodating a pigtail optical fiber.

The second accommodating part 36b has the side wall 33, which forms an outer peripheral surface of the container 30, and the interior partition wall 35 such that it is formed in the shape of a groove from. The groove is formed to such a width that, for example, the pigtail optical fiber can be wound in one to several layers. The pigtail optical fiber is wound around the outer periphery of the partition wall 35, and is accordingly formed so that the radius of curvature of the corner region is equal to or greater than the allowable bend radius of the optical fiber, as with the container 12.

The container 30 is assembled by closing the open surface of the container main body 31 with the cover 32, and inserting an assembly screw via a screw insertion hole 32a into a screw insertion hole 37a provided to a stage part 37 of the container main body 31. When the container 30 is assembled, a state will be obtained wherein the first accommodating part 36a for accommodating the optical fiber coil is closed. A small width portion having a width that is larger than the diameter of the pigtail optical fiber, but equal to or less than twice the diameter thereof, is formed on the outer periphery of the second accommodating part 36b by an edge 33a of the side wall 33 and the cover 32. A large width portion having a width that is equal to or greater than twice the outside diameter of the pigtail optical fiber is formed on the outer periphery of the second accommodating part 36b by a notch 34 in the side wall 33 and the cover 32. The pigtail optical fiber is inserted into the second accommodating part 36b of the container 30 via the small width portion being wound on the container and is drawn out from the large width portion (region of the notch 34).

A passage 35a for creating communication between the first accommodating part 36a and the second part 36b is provided in the partition wall 35. The passage 35a is formed, for example, on the side regions in the generally polygonal shape, and is used to guide the pigtail optical fiber, which is fusion-spliced to both ends of the optical fiber coil accommodated in the first accommodating part 36a, from the first accommodating part 36a to the second accommodating part 36b. Forming the passage 35a on the side regions allows the pigtail optical fiber to be guided to the second accommodating part 36b in a relatively smooth manner without being excessively bent in comparison to that would occur if the passage 35a were formed in the corner regions.

The optical fiber coil comprising a functional optical fiber and accommodated inside the container is preferably formed in a coil having a small diameter in order to reduce the accommodating volume. However, it is known that when an optical fiber is formed into a coil, birefringence occurs as a result of the small bending diameter and polarization mode dispersion (PMD) increases. Therefore, obtaining a small-size optical fiber coil having low deterioration of PMD characteristics is not straightforward, and results in a low yield.

Figure 5A:
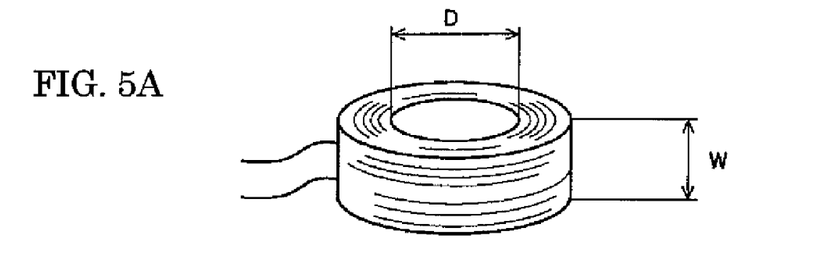
FIG. 5A is a conceptual diagram that shows a configuration of the optical fiber coil which is used in an experiment.

Optical fiber coils were fabricated in a variety of configurations and the relationship between the fiber length and PMD were compared. FIG. 5A is a conceptual diagram that shows a configuration of the optical fiber coil used in an experiment. The optical fiber coil used in the experiment includes a single mode optical fiber having a standard specification, wherein the diameter of the glass fiber was 125 µm, and the cladding diameter was approximately 250 µm. The PMD was preferably equal to or less than $0.2$ ps/$\sqrt{\text{km}}$, and more preferably $0.1$ ps/$\sqrt{\text{km}}$.

Figure 5B:
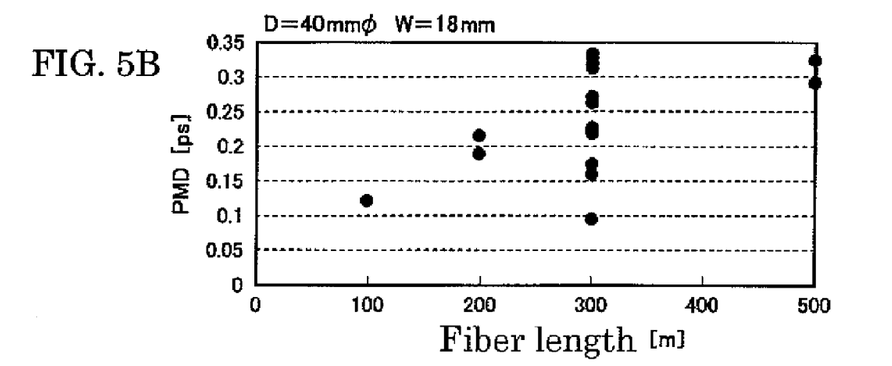
FIGS. 5B, 5C, and 5D are graphs that show the relationship between the fiber length of a plurality of coils having different inside diameters and PMD.
Figure 5C:
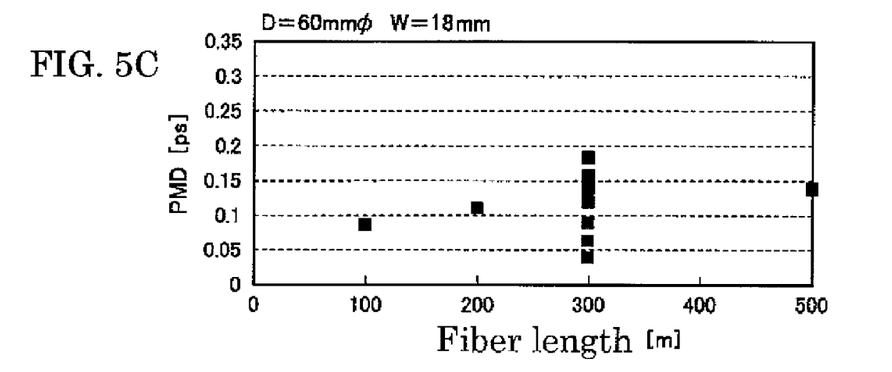
Figure 5D:
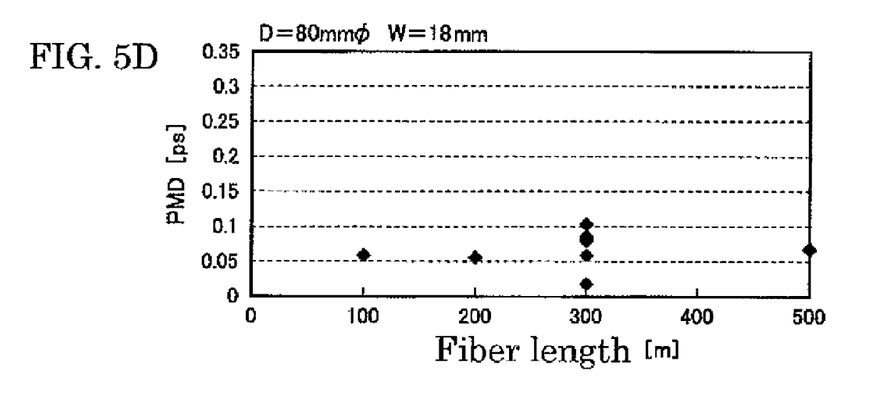

FIGS. 5B, 5C, and 5D are graphs that show the relationship between the PMD and the fiber length of a plurality of coils having different values for the inside diameter D. When the coil inside diameter D was 40 mm and the coil winding width W was 18 mm (FIG. 5B), the PMD increased as the optical fiber became longer, despite some degree of variation. The resulting characteristics were undesirable. When the coil inside diameter D was 60 mm and the coil winding width W was 18 mm (FIG. 5C), a PMD of approximately 0.2 ps or less could be obtained. When the coil inside diameter D was 80 mm and the coil winding width W was 18 mm (FIG. 5D), a PMD of approximately 0.1 ps or less could be obtained, so that a favorable PMD could be achieved. However, when the coil inside diameter D was 80 mm, the volume to be accommodated in the container increased, which is unsuitable in terms of miniaturizing the optical fiber module.

Figure 6:
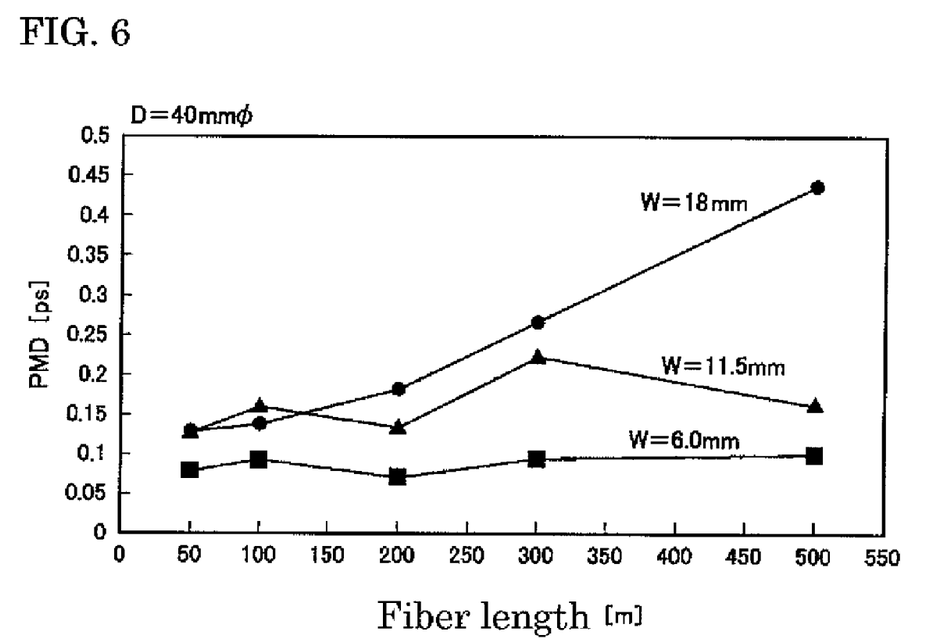
FIG. 6 is a graph that shows the relationship between the fiber length and PMD regarding a plurality of coils having different winding widths.

FIG. 6 is a graph that shows the relationship between the fiber length of the optical fiber coil 20 and the PMD when the inside diameter D is fixed at 40 mm and the winding width is changed to 6.0 mm, 11.5 mm, and 18.0 mm. When the winding width W was 11.5 mm or less, a PMD of 0.2 ps or less could be achieved at an optical fiber length of 500 m or less. When the winding width W was 6.0 mm or less, a PMD of 0.1 ps or less could be achieved at an optical fiber length of 500 m or less. A smaller winding width W corresponded to a better PMD.

These results showed that both the winding inside diameter D and the winding width W of the optical fiber coil had a favorable or unfavorable relationship with the PMD. The correlations therebetween were accordingly investigated. This confirmed that a desirable PMD could be obtained by having a prescribed value or greater for "winding inside diameter D/winding width W." For example, in FIGS. 5B to 5D, a PMD of 0.2 or less could be achieved when D=60 mm and W=18 mm (D/W=3.3); and when D=80 mm, and W=18 mm (D/W 4.4). In FIG. 6, a PMD of 0.2 ps or less was achieved when, for example, D=40 mm and W≦11.5 mm (D/W≧3.5 or greater); and a PMD of 0.1 ps or less was achieved when D=40 mm, W≦6.0 mm (D/W=6.7).

Specifically, the results showed that in order to ensure that the PMD is 0.2 ps or less, (D/W) is preferably 3.0 or greater as a minimum. Therefore, when constructing an optical fiber module, the inside diameter D and the winding width W of the optical fiber coil to be accommodated in the container are set within a range that is not excessively large, while the above-mentioned numerical values are taken into account, and the configuration of the container exterior should be small and compact.

While this invention has been described in connection with what is presently considered to be the most practical and preferred embodiments, the invention is not limited to the disclosed embodiments, but on the contrary, is intended to cover various modifications and equivalent arrangements included within the spirit and scope of the appended claims.

The entire disclosure of Japanese Patent Application No. 2006-290653 filed on Oct. 26, 2006 including specification, claims drawings and summary are incorporated herein by reference in its entirety.

What is claimed is:

1. A container for accommodating an optical fiber coil comprising:
   a first accommodating part configured and arranged to accommodate an optical fiber coil having a functional optical fiber; and
   a second accommodating part disposed on an outer periphery side of the first accommodating part, and configured and arranged to windingly accommodate an excess length portion of a pigtail optical fiber optically connected to the functional optical fiber, the second accommodating part having a gap extending along an entire outer periphery wall of the second accommodating part so that the second accommodating part communicates with an exterior via the gap,
   the gap includes a small width portion and a large width portion.

2. The container according to claim 1, wherein
   the outer periphery wall of the second accommodating part has a generally polygonal shape, and the large width portion is formed in corner regions of the generally polygonal shape.

3. The container according to claim 2, wherein
   an inner periphery wall of the second accommodating part has a generally polygonal shape, and a passage for the pigtail optical fiber leading from the first accommodating part to the second accommodating part is formed in side regions of the generally polygonal shape of the inner periphery wall.

4. The container according to claim 1, wherein
   an inner periphery wall of the second accommodating part has a generally polygonal shape, and a passage for the pigtail optical fiber leading from the first accommodating part to the second accommodating part is formed in side regions of the generally polygonal shape of the inner periphery wall.

5. The container according to claim 1, wherein
   an inner periphery wall of the second accommodating part has a generally polygonal shape, and a passage for the pigtail optical fiber leading from the first accommodating part to the second accommodating part is formed in side regions of the generally polygonal shape of the inner periphery wall.

6. An optical fiber module comprising:
   a container that accommodates an optical fiber coil, the container having a first accommodating part and a second accommodating part with the second accommodating part being disposed on an outer periphery side of the first accommodating part, the second accommodating part having a gap extending along an entire outer periphery wall of the second accommodating part so that the second accommodating part communicates with an exterior via the gap;
   an optical fiber coil having a functional optical fiber accommodated in the first accommodating part of the container; and
   a pigtail optical fiber that is optically connected to the functional optical fiber with an excess length portion of the pigtail optical fiber windingly accommodated in the second accommodating part of the container,
   the gap includes a small width portion and a large width portion.

7. The optical fiber module according to claim 6, wherein
   the container is arranged such that a value obtained by dividing an inside diameter of the optical fiber coil by a winding width of the optical fiber coil is equal to 3.0 or greater.

8. The optical fiber module according to claim 7, wherein
   a length of the functional optical fiber of the optical fiber coil is 500 m or less, and a polarization mode dispersion of the optical fiber coil is 0.2 ps or less.

9. The optical fiber module according to claim 7, wherein
   a length of the functional optical fiber of the optical fiber coil is 500 m or less, and a polarization mode dispersion of the optical fiber coil is 0.2 ps or less.

10. A container for accommodating an optical fiber coil comprising:
    a first accommodating part configured and arranged to accommodate an optical fiber coil having a functional optical fiber; and
    a second accommodating part disposed on an outer periphery side of the first accommodating part, and configured and arranged to windingly accommodate an excess length portion of a pigtail optical fiber optically connected to the functional optical fiber, the second accommodating part having a gap extending along an entire outer periphery wall of the second accommodating part so that the second accommodating part communicates with an exterior via the gap, the gap forms an opening hole so that the pigtail fiber draws outward directly from the opening hole.

* * * * *